March 13, 1956 B. NAGLER 2,738,021
JET DRIVEN HELICOPTER ROTOR SYSTEM
Filed June 10, 1952 3 Sheets-Sheet 1
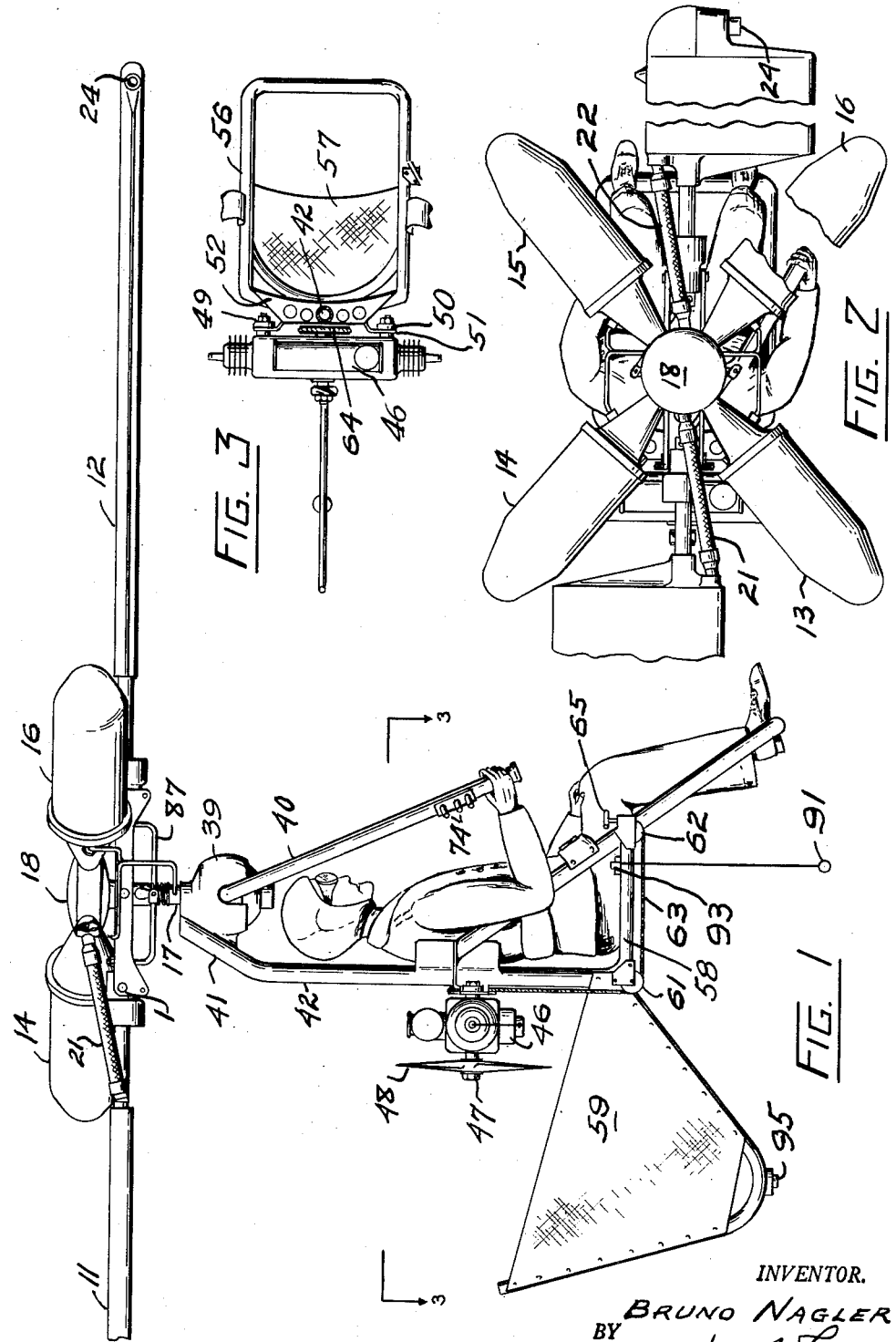
INVENTOR.
BRUNO NAGLER
BY Martin J. Finnegan
ATTORNEY March 13, 1956 B. NAGLER 2,738,021
JET DRIVEN HELICOPTER ROTOR SYSTEM
Filed June 10, 1952 3 Sheets-Sheet 2

INVENTOR.
BRUNO NAGLER
BY
Martin J. Finnegan
ATTORNEY

March 13, 1956 B. NAGLER 2,738,021
JET DRIVEN HELICOPTER ROTOR SYSTEM
Filed June 10, 1952 3 Sheets-Sheet 3

INVENTOR.
BRUNO NAGLER
BY Martin J. Finnegan
ATTORNEY

United States Patent Office 2,738,021
Patented Mar. 13, 1956

2,738,021

JET DRIVEN HELICOPTER ROTOR SYSTEM

Bruno Nagler, Boston, Mass., assignor to Nagler Helicopter Company, Inc., a corporation of Delaware Application June 10, 1952, Serial No. 292,688

2 Claims. (Cl. 170—135.4)

This invention relates to aeronautics, and particularly to methods and means whereby a person may cause himself to ascend to any desired height and subsequently return to the earth's surface, at a gliding angle, with or without an intervening period or periods of horizontal cruising at the level of original ascent, or at lower levels on the descending glide path.

In my patent application No. 252,647 filed October 23, 1951, I have disclosed and claimed a craft having rotatable wings ("Blades") of direct vertical flight and subsequent return to earth along an oblique glide path; the rotation of the wings being brought about by the discharge of fluid under pressure from the wing tips, and the pressure fluid being generated in power plants of the rocket type, mounted on the respective wings. The present invention relates to the same general character of craft, except that the power plant is centrally disposed on the rotating wing assembly, and the generated pressure fluid is delivered to all the wings, simultaneously, by way of a common manifold chamber, in response to the firing of a single rocket unit, constituting one of the group of rocket units comprising said fixedly-mounted power plant.

Is is an object of the invention, therefore, to provide a novel method of transportation through air, which comprises the steps of (1) igniting a single charge of solid combustible material at a point centrally disposed on the rotating wing assembly, and (2) delivering simultaneously to all of the individual wings of the assembly the pressure fluid generated from said single combustible charge, by means of a manifold conduit connection common to all of said wings.

A second object of the invention is to provide an aircraft having rotary wings, a central manifold forming part of the rotating wing assembly, and a plurality of pressure fluid generating rocket motors secured to said central manifold in angularly spaced positions about the periphery of said manifold; the said manifold serving as the conduit for delivery to the rotary wings of the pressure fluid generated by each of said rocket motors, in sequence.

These and other objects of the invention will be understood upon reference to the following description of the embodiment of the invention illustrated in the accompanying drawings, wherein—

Fig. 1 is an elevation view of the invention as embodied in a flying machine having rotary wings journaled in a supporting rig adapted for suspension about the body of a person to be flown therein; the rig also carrying a power plant equipped with a vertically rotating propeller;

Fig. 2 is a plan view of the machine of Fig. 1;

Fig. 3 is a horizontal sectional view on line 3—3 of Fig. 1;

Figure 4:
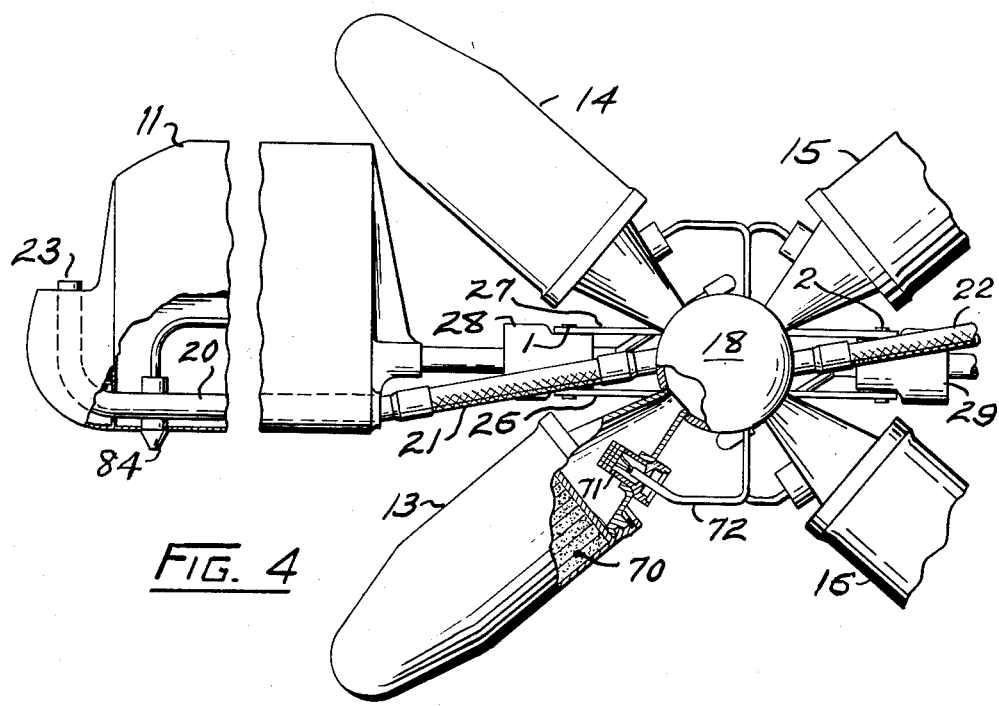
Fig. 4 is a fragmentary plan view, on a scale larger than that of Fig. 2.
Figure 5:
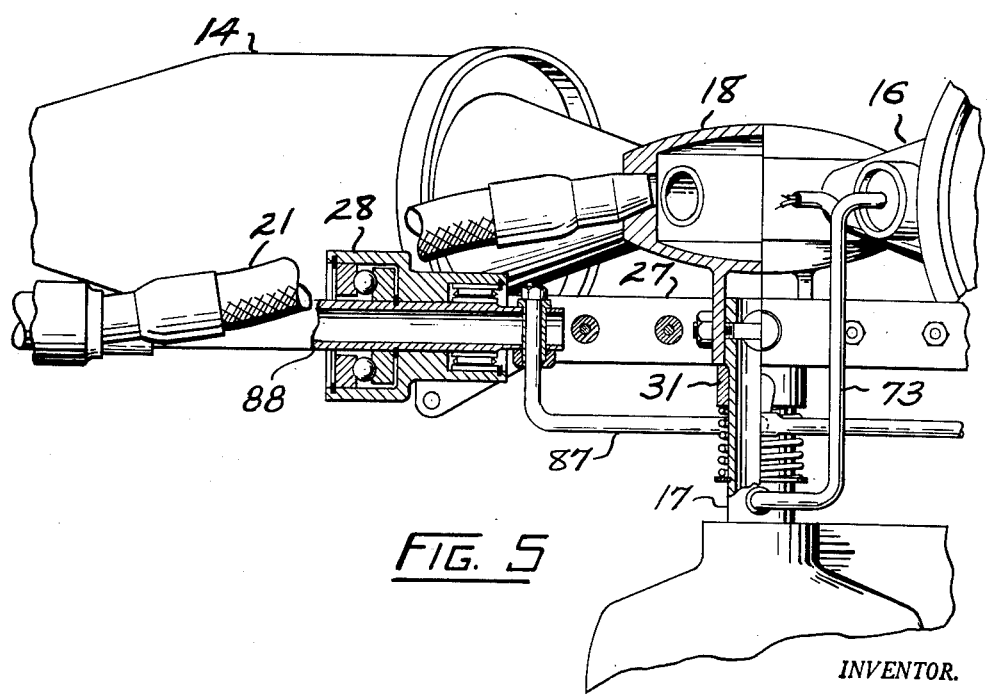
Fig. 5 is a vertical sectional view of the upper portion of the machine on a scale similar to that of Fig. 4.

Referring first to Figs. 1, 4 and 5, there is illustrated therein a pair of hollow blades, or wings, 11, 12 of aerofoil cross-section, and a series of fluid pressure generating units (rocket motors) 13—16; the units 13 to 16 being integrated with the vertical spindle 17 at the enlarged central portion 18 which constitutes the single manifold chamber for all of the rocket motors. Each of these rocket units is adapted to be ignited individually, by electrical means, and each is adapted to discharge its liberated gases into the manifold 18 which in turn directs the gases into the horizontally disposed flexible tubes 21, 22 feeding the tubes 20 extending through each blade, and terminating in the discharge jets 23, 24 at the tips of the respective blades.

Figures 6, 7:
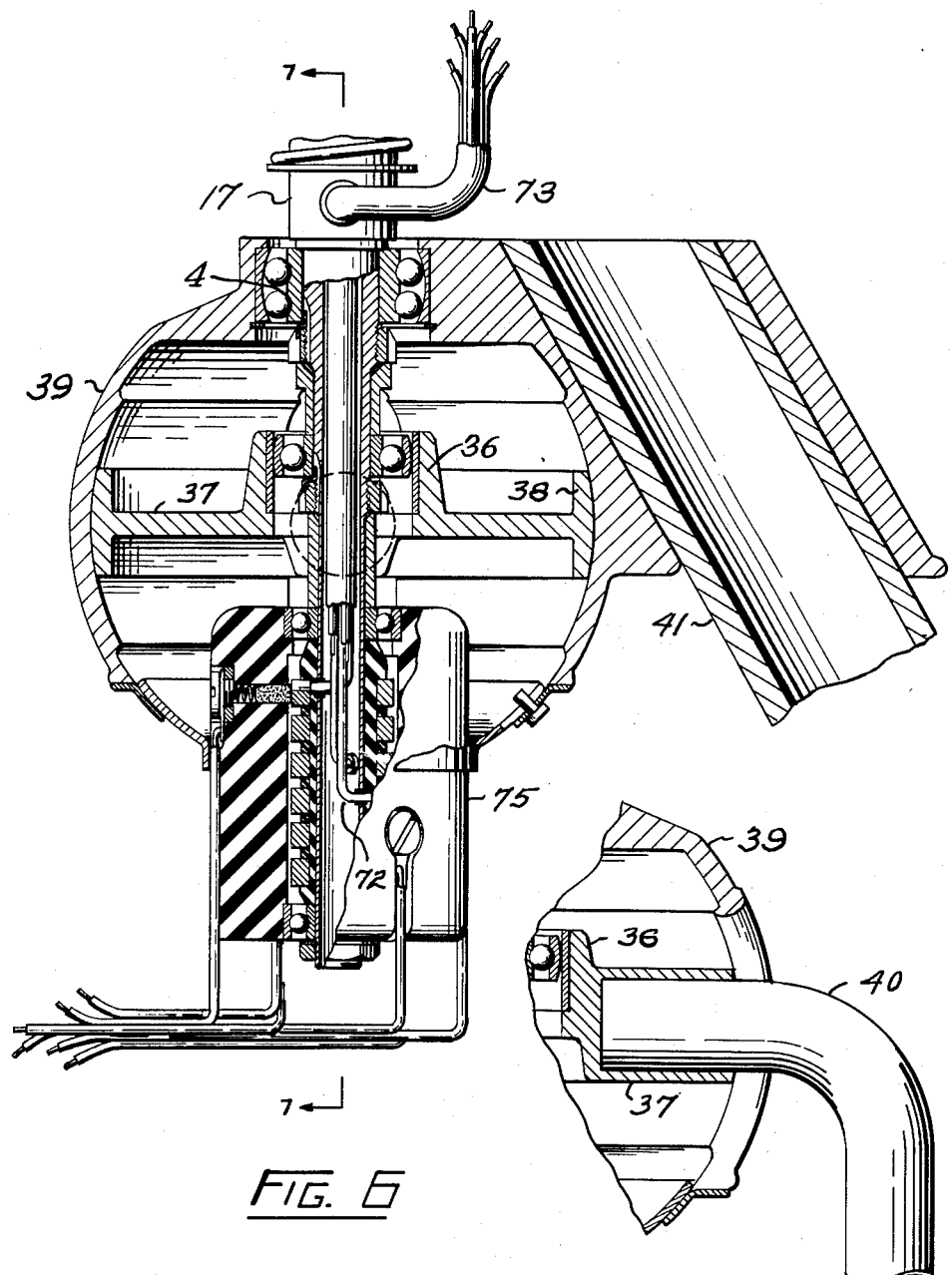
Fig. 6 is a vertical sectional view of the portion of the machine immediately below the portion shown in Fig. 5.
Fig. 7 is a sectional view along line 7—7 of Fig. 6.

The blades 11, 12 are rotatably supported in the bearing assemblies 28 and 29, the latter being in turn hinged on pins 1 and 2 to the parallel yoke members 26, 27 attached to the skirt 31 depending from manifold 18 and surrounding the upper portion of spindle 17. The lower portion of spindle 17 is received in the ball-bearing hub 36 of an irreversible steering assembly including a ring 37 having a spherical-surfaced rim 38 fitting a socket bearing 39, which latter is mounted at the upper curved end 41 of vertical column 42, said column 42 being the main element of the suspension rig. The bearing 39 is slotted to receive the end of steering rod 40, the latter fitting into a socket in ring 37, as shown best in Fig. 7.

The power plant 46, whose shaft 47 carries the propeller 48, is fitted with two brackets 49 and 50, adapted to receive the cross-bar 51 welded to saddle 52 of the suspension rig, the saddle being apertured to receive the column 42 at the point adjacent to the point of attachment of cross-bar 51.

Also secured to saddle 52 (in such manner as to permit folding of the parts when not in use) are the ends of a U-shaped tube 56 adapted to serve as a leg rest for use by the pilot of the rig. A seat 57 is attached to a horizontally disposed curved element 58, into which the lower end of the vertical column 42 is fitted. A stabilizer panel 59 is attached to the column 42, to extend rearwardly, as shown; the rig being generally similar to that of my co-pending application, above identified. Body-retaining straps may, of course, be attached wherever desired. Pulleys 61, 62 guide a cable 63 that is wound about sheave 64 on the engine shaft 47. The pilot grasps handle 65, on the end of this cable, and exerts a sharp pull thereon for the purpose of starting the engine; the cable being spring-retracted, in the usual manner.

Fig. 4 illustrates in some detail the interior structure of one of the rocket motors. As shown therein, these motors are in angularly disposed relationship about the vertical axis of the craft, each motor containing a "stick" of solid propellant 70 adapted to be ignited along its forward face, when electric current is delivered to igniter electrode 71, by means of lead wire 72, which is one of a group of wires carried in sheath 73; said wires leading to the appropriate terminals of switch assembly 74.

Additional rocket units (not shown), preferably may be provided to operate as "cushion"-creating agencies, just prior to contact with the ground, on the gliding descent, in the manner explained more fully in my co-pending application, above identified.

The conductors in sheath 73 lead to their respective rocket units 13 to 16, except that two of the conductors lead to the rocket units 84 on the respective blade tips; ignition of the latter rocket units being controlled by the automatic switch 95 which closes upon contact between stabilizer 59 and the ground, as the craft descends. The firing of these two blade-tip rockets causes the direction of force application to be reversed, thus bringing rotation of the blades to a promp halt, once the craft has landed; the circuit connections from switch 95 to the rockets 84, also the connection to one of the rockets from switch 93 (actuated by weight 91) and to the other rockets from switches 74 (actuated manually)—being as illustrated in "Fig. 7" of my co-pending application, above identified. The electrical connections from leads 72 to switch 74 include the collector ring assembly 75, corresponding to that of my co-pending application, above identified.

During the flight the pitch of the blades 11, 12 may be varied, as desired, by manual actuation of a cross-bar 87, shown best in Fig. 5. The manual operating means to adjust cross-bar 87 axial to the blades 11 and 12 is not shown on the drawing. Depression of cross-bar 87 turns the tube 88 and hence the rotating blade 11 downwardly (as viewed in Fig. 5) about the axis of tube 88, to vary the blade pitch to an angle that is best suited to vertical ascent, and likewise blade 12 (not shown in Fig. 5) will be correspondingly turned to its best pitch angle for ascent. Reverse actuation of cross-bar 87 will return blades 11, 12 to the opposite pitch positions, the latter being best for the gliding descent of the rig. During such descent the rider steers the rig by leaning to the left or right, as desired, and applying corresponding pressure to the steering rod 40 to vary the angle of inclination of the rotating blade assembly. By moving the steering rod 40 the rider causes a tilting of the steering ring 37 about its center, which coincides with the center of the spherical socket bearing 39, and a lateral displacement of the lower end of the vertical spindle 17 which causes the spindle 17 to tilt about the center of the self-aligning bearing assembly 4, positioned at the top of the spherical socket bearing 39. This tilting of spindle 17 caused by moving the steering rod 40 brings about a tilting of the plane of rotation of the blade assembly and the resulting steering effect. The desired steering effect is obtained by moving the steering rod 40 in the appropriate direction.

What I claim is:

1. In an aircraft of the rotary wing type, a suspension rig, a rotatable wing assembly comprising a plurality of blades of aerofoil cross-section rotatably mounted on said suspension rig adapted to lift said aircraft when said wing assembly is rotated, each of said blades having at least one jet orifice along its trailing edge, a series of rocket units and a manifold common to all rocket units integrally mounted upon said rotatable wing assembly, solid-fuel rocket charges within said rocket motors, fluid conducting passages connecting the common manifold with the jet orifices in the blades, and means for igniting and expending said solid-fuel rocket charges in sequence.

2. In an aircraft of the rotary wing type, a rotatable wing assembly comprising a plurality of blades of aerofoil cross-section, each of said blades having at least one jet orifice along its trailing edge, a hub member upon which said blades are hingedly mounted, a series of rocket units and a manifold common to all rocket units integrally mounted upon said hub member, solid-fuel rocket charges within said rocket motors, fluid conducting passages connecting the common manifold with the jet orifices in the blades, and means for igniting and expending said solid-fuel rocket charges in sequence.

References Cited in the file of this patent

UNITED STATES PATENTS

| 1,099,083 | Duc | June 2, 1914 |
| 2,178,014 | Brown | Oct. 31, 1939 |
| 2,261,337 | Campbell | Nov. 4, 1941 |
| 2,330,056 | Howard | Sept. 21, 1943 |
| 2,491,042 | Hayot | Dec. 13, 1949 |
| 2,557,128 | Magill | June 19, 1951 |
| 2,596,378 | Dobbins | May 13, 1952 |
| 2,612,955 | Tenney et al. | Oct. 7, 1952 |

FOREIGN PATENTS

| 427,951 | France | Aug. 19, 1911 |
| 632,065 | Great Britain | Nov. 15, 1949 |